(12) United States Patent
Eldridge et al.

(10) Patent No.: US 7,414,757 B2
(45) Date of Patent: Aug. 19, 2008

(54) METHOD FOR COMPRESSING PRINTING HINT DATA SENT TO A PRINTER

(75) Inventors: George L. Eldridge, Long Beach, CA (US); Peter A. Crean, Penfield, NY (US); Jon S. McElvain, Redondo Beach, CA (US); William E. Nelson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 986 days.

(21) Appl. No.: 10/674,837

(22) Filed: Sep. 30, 2003

(65) Prior Publication Data

US 2005/0068551 A1    Mar. 31, 2005

(51) Int. Cl.
| | |
|---|---|
| H04N 1/41 | (2006.01) |
| H04N 1/413 | (2006.01) |
| H04N 1/403 | (2006.01) |
| H04N 1/407 | (2006.01) |
| H04N 1/409 | (2006.01) |
| H04N 1/405 | (2006.01) |
| G05B 13/00 | (2006.01) |
| G06T 1/60 | (2006.01) |
| G06K 15/02 | (2006.01) |

(52) U.S. Cl. .................. 358/426.13; 358/426.01; 358/1.15; 358/1.16; 358/444; 358/3.15; 358/2.1; 358/1.9

(58) Field of Classification Search .................. None
See application file for complete search history.

(56) References Cited

U.S. PATENT DOCUMENTS

| | | | | |
|---|---|---|---|---|
| 3,967,052 A * | 6/1976 | Judice | ......................... | 348/798 |
| 4,464,650 A | 8/1984 | Eastman et al. | ................ | 341/51 |
| 4,673,987 A * | 6/1987 | Toyokawa | .................... | 382/244 |
| 4,918,540 A * | 4/1990 | Ohtani | ........................ | 382/239 |
| 5,075,779 A * | 12/1991 | Lefebvre et al. | ............ | 358/3.29 |
| 5,243,446 A * | 9/1993 | Pollich et al. | ................ | 358/466 |
| 5,687,303 A | 11/1997 | Motamed et al. | ........... | 358/1.18 |
| 6,006,013 A * | 12/1999 | Rumph et al. | ............... | 358/1.15 |
| 6,020,979 A * | 2/2000 | Zeck et al. | .................... | 358/1.9 |
| 6,091,509 A * | 7/2000 | Hickman et al. | ........... | 358/1.16 |
| 6,144,461 A * | 11/2000 | Crean et al. | ................... | 358/1.9 |
| 6,243,499 B1 * | 6/2001 | Loce et al. | ................... | 382/269 |
| 6,272,252 B1 | 8/2001 | Eldridge et al. | ............. | 382/232 |
| 6,307,977 B1 * | 10/2001 | Eldridge et al. | ............. | 382/245 |
| 6,529,553 B2 * | 3/2003 | Nguyen et al. | .......... | 375/240.22 |

(Continued)

FOREIGN PATENT DOCUMENTS

JP     2005018764 A  *  1/2005

*Primary Examiner*—Twyler L. Haskins
*Assistant Examiner*—Myles D Robinson
(74) *Attorney, Agent, or Firm*—Oliff & Berridge, PLC

(57) ABSTRACT

There is disclosed in embodiments methods relating to the compression of printing hints. The method in embodiments generates a first set of image pixels having corresponding printing hints. The printing hints are then adjusted to produce a second set of image pixels processed in such a way that an end printed result is visually equivalent to a printed result using the first set of image pixels thereby reducing the entropy in the printing hints. The method improves the compression ratio of an image using printing hints by adjusting the printing hints of pixels that are zero or fully saturated. The printing hints are adjusted in such a way to reduce the complexity of the printing hints.

16 Claims, 1 Drawing Sheet

U.S. PATENT DOCUMENTS

| | | | |
|---|---|---|---|
| 6,941,014 B2* | 9/2005 | Lin et al. | 382/176 |
| 7,218,420 B1* | 5/2007 | Tai et al. | 358/3.2 |
| 7,295,346 B2* | 11/2007 | Loce et al. | 358/2.1 |
| 7,382,494 B2* | 6/2008 | McElvain | 358/2.1 |
| 2002/0076103 A1* | 6/2002 | Lin et al. | 382/173 |
| 2002/0097430 A1* | 7/2002 | Curry | 358/1.15 |
| 2003/0025945 A1* | 2/2003 | Rumph et al. | 358/426.13 |
| 2004/0001648 A1* | 1/2004 | Curry et al. | 382/302 |
| 2004/0227963 A1* | 11/2004 | Jacobsen et al. | 358/1.9 |
| 2004/0263878 A1* | 12/2004 | McElvain | 358/1.9 |
| 2004/0263909 A1* | 12/2004 | McElvain | 358/2.1 |
| 2004/0264786 A1* | 12/2004 | McElvain | 382/233 |

* cited by examiner

METHOD FOR COMPRESSING PRINTING HINT DATA SENT TO A PRINTER

BACKGROUND

1. Technical Field

The present invention in embodiments relates generally to data compression and decompression and, more particularly, to devices and method for the compression of printing hints by processing saturated pixels with different rendering hint values in a very similar manner; for example, similar enough to be indistinguishable by the eye.

2. References

Digital color imaging on high-resolution printers such as xerographic printers requires the handling of large amounts of video data for each page. The color image for each page is typically represented as a set of four color planes, usually cyan, magenta, yellow, and black. Each color plane is a set of scanlines and each scanline is a sequence of individual image pixels.

The image quality can be improved using object optimized printing as described by Motamed in U.S. Pat. No. 5,687,303. With object optimized printing, printing hints in the form of metabits are generated for each image pixel and sent to an IOT (Image Output Terminal). The printing hints, which are utilized by a CRM (Contone Rendering Module) within the printer, can optimize such processing subsystems as halftone generation, halftone screen size and angle, color space transformation, tone reproduction curve, IOT output correction, and the like.

The printing hints may improve the quality of the printed output; however, they also may increase that amount of data required to represent the color images. It is often desirable to reduce the size of the color images and printing hints to reduce the amount of solid state memory required to buffer the images, reduce the amount of disk space to store the images, and speed up transfer of the images within the printing system. This may be accomplished by compressing the page images and printing hints after they are generated and decompressing them immediately before they are needed for printing.

There are a number of different compression schemes to reduce the size of the page images. One such method is to use the lossy or lossless JPEG compression standard. Better compression can be achieved with more complex algorithms. The printing hints should be compressed using a lossless algorithm such as run length coding or a lossless adaptive dictionary-based coding such as described by Eastman in U.S. Pat. No. 4,464,650.

The compressed size of the printing hints is dependent on the lossless compression algorithm used and the complexity of the printing hints. The compressed size of the printing hints can be reduced by reducing the complexity of the printing hints.

SUMMARY

There is disclosed in embodiments methods relating to the compression of printing hints. The method in embodiments generates a first set of image pixels having corresponding printing hints. The printing hints are then adjusted to produce a second set of image pixels processed in such a way that an end printed result is visually equivalent to a printed result using the first set of image pixels thereby reducing the entropy in the printing hints. The method improves the compression ratio of an image using printing hints by adjusting the printing hints of pixels that are zero or fully saturated. The printing hints are adjusted in such a way to reduce the complexity of the printing hints.

DETAILED DESCRIPTION

Figure 1:
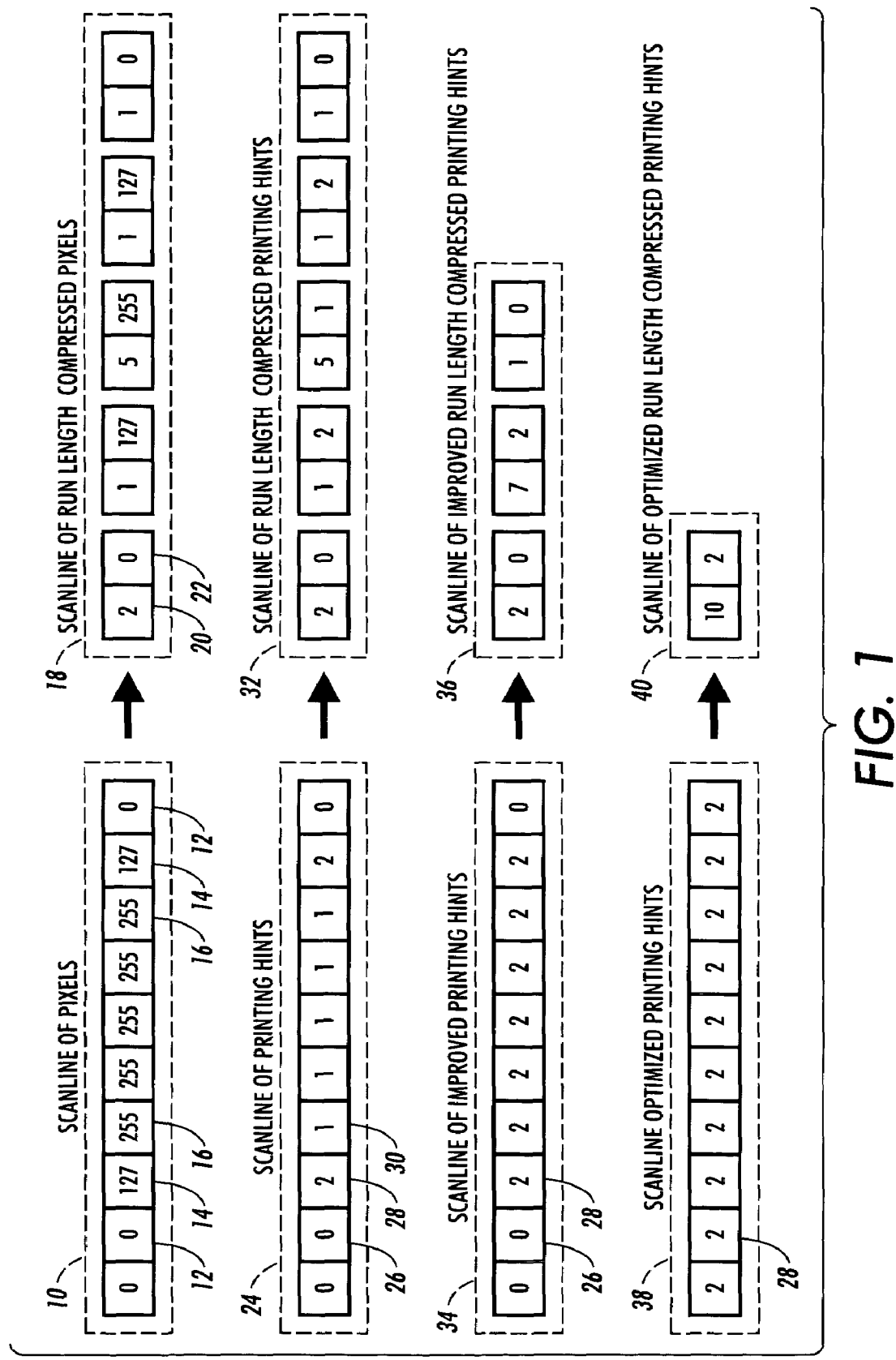
FIG. 1 is an example of a scanline with printing hints being compressed.

Aspects disclosed herein in embodiments include generating a first set of image pixels having corresponding printing hints, and adjusting the printing hints to produce a second set of image pixels processed to result in an end print visually substantially equivalent to a printed result using the first set of image pixels. A contone rendering module within a printer generates the first set of image pixels having corresponding printing hints for processing saturated pixels thereby producing different printing hint values. An image output terminal receives the different printing hint values from the contone rendering module to produce a second set of image pixels processed to result in and end print which is visually substantially equivalent to a printed result using the first set of image pixels thereby reducing the entropy in the printing hints.

In embodiments the methods disclosed use of several characteristics of the contone rendering module (hereinafter CRM) in a printer to reduce the complexity of the printing hints. Printing hints may also be referred to as rendering hints or tags. The CRM uses the printing hints along with the corresponding image pixel value to determine the output signal to be sent to an image output terminal (hereinafter IOT). The output of the CRM is dependent on many parameters including the halftone algorithm, screen angle, and pixel location. One characteristic of the CRM is that it almost always generates a full output signal to the IOT for pixels that are fully saturated regardless the value of the printing hint for that pixel. In other words, the CRM handles a saturated pixel very nearly the same when the printing hint indicates it is a text pixel and when the printing hint indicates it is an edge pixel.

The printing hint for a saturated pixel from text pixel to edge pixel can be changed substantially with no significant change in the output image. Changing the printing hint from text pixel to edge pixel may reduce the complexity of the printing hints and thus enable higher compression of the printing hints.

Another characteristic of the CRM is that it usually generates no output signal to the IOT for pixels that are zero regardless the value of the printing hint for that pixel. That is, the CRM handles a zero pixel very nearly the same when the printing hint indicates it is a background pixel and when the printing hint indicates it is an edge pixel. Therefore, the printing hint for a zero pixel from background pixel to edge pixel can be changed etc, with no significant change in the output image. Changing the printing hint from background pixel to edge pixel may reduce the complexity of the printing hints and thus enable higher compression of the printing hints.

Lossy data compression techniques provide for an inexact representation of the original uncompressed data such that the decoded (or reconstructed) data differs from the original unencoded/uncompressed data. Lossy data compression is also known as irreversible or noisy compression. Entropy is defined as the quantity of information in a given set of data. Thus, one obvious advantage of lossy data compression is that the compression ratios can be larger than the entropy limit, all at the expense of information content. Many lossy data compression techniques seek to exploit various traits within the human senses to eliminate otherwise imperceptible data. For example, lossy data compression of visual imagery might seek to delete information content in excess of the display resolution or contrast ratio.

Also, lossless data compression techniques can provide an exact representation of the original uncompressed data. Simply stated, the decoded (or reconstructed) data is identical to the original unencoded/uncompressed data. Lossless data compression is also known as reversible or noiseless compression. Thus, lossless data compression has, as its current limit, a minimum representation defined by the entropy of a given data set.

Referring now to FIG. 1, there is illustrated examples of a scanline with printing hints being compressed. As shown in FIG. 1, a scanline 10 of print data consists of a sequence of pixels. Pixels 12 with a value of zero indicate areas where there should be no toner while pixels 16 with a value of 255 indicate areas of maximum toner. Pixels 14 with an intermediate value indicate areas where toner, comprised for example of a suitable resin and colorant will be present or not present based on the halftoning algorithm. In this particular scanline the pixels 14 are edges between an area of white pixels 12 and an area of fully saturated pixels 16, perhaps part of a text character rendered with anti-aliasing technology.

The scanline 10 can be compressed into a scanline 18 using a run length compression scheme. The compressed scanline 18 consists of pairs of values 20 and 22, respectively. The first value 20 of the pair is a run length. The second value 22 of the pair is the value of the pixels in the run. In this particular case the use of run length coding does not reduce the size of the encoded scanline compared to the original.

Referring once again to FIG. 1, associated with scanline 10 is a scanline 24 of printing hints. There is a one-to-one correlation between the pixels and the printing hints. Printing hints 26 with a value of zero indicate background (white) pixels. Printing hints 30 with a value of one indicate fully saturated pixels. Printing hints 28 with a value of two indicate edge pixels.

The scanline 24 of printing hints can be run length compressed into a scanline 32 of compressed Printing hints. In this example the use of run length coding does not reduce the size of the encoded scanline of printing hints compared to the original.

In embodiments the methods disclosed optimizing the printing hints so that they will compress better using run length compression. This optimization takes advantage of a characteristic of the rendering algorithm in the CRM. A fully saturated pixel with a printing hint indicating it is a text pixel is processed in the CRM in very nearly the same way as a fully saturated pixel with a printing hint indicating it is an edge pixel. Taking advantage of this characteristic, all of the printing hints indicating saturated text pixels can be replaced with printing hints indicating edge pixels. Turning once again to FIG. 1, the scanline 34 of improved printing hints contains only background hints 26 and edge hints 28.

The scanline 34 of the printing hints can be run length compressed into a scanline 36 of compressed improved Printing hints. In this example the use of printing hints increases the amount of compression. Relative to the data size required in scanline 32, the compressed data size using this method is reduced by 40%.

It is possible to further optimize the printing hints so that they will compress even better using run length compression. This further optimization takes advantage of another characteristic of the rendering algorithm in the CRM. A zero pixel with a printing hint indicating it is a background pixel is processed in the CRM in very nearly the same way as a zero pixel with a printing hint indicating it is an edge pixel. Taking advantage of this characteristic, all of the printing hints indicating background pixels can be replaced with printing hints indicating edge pixels. Once again, referring to FIG. 1, the scanline 38 of optimized printing hints contains only hints edge hints 28.

The scanline 38 of optimized printing hints can be run length compressed into a scanline 40 of compressed optimized printing hints. In this example the use of optimized printing hints increases the amount of compression significantly.

In this process, the first step is to generate the image pixels and the corresponding printing hints. The next step is to adjust the printing hints for image pixels that are fully saturated. Fully saturated pixels that are adjacent to pixels with printing hints indicating they are edge pixels will have their printing hints changed to indicate that they are edge pixels. The next step is to adjust the printing hints for image pixels that are zero. Zero pixels that are adjacent to pixels with printing hints indicating they are edge pixels will have their printing hints changed to indicate that they are edge pixels. The final step is to losslessly compress the optimized printing hints. In this case, relative to the data size required in 32, the compressed data size using this method is reduced by 80%.

This example uses run length compression to demonstrate the improved compression from the simplification of the printing hints. Other compression algorithms could be used.

It will be appreciated by those of ordinary skill in the art that the above are merely examples. Other embodiments may be readily apparent to those of ordinary skill in the art.

What is claimed is:

1. A method for compressing data sent to a printer with no significant change in the output image, comprising:
    generating a first set of image pixels having corresponding printing hints,
    adjusting the printing hints to produce a second set of image pixels by adjusting the printing hints for image pixels that are fully saturated,
    wherein fully saturated pixels that are sequentially adjacent to pixels with printing hints indicating they are edge pixels will have their printing hints changed to indicate that they are edge pixels and will propagate the adjustment to further sequentially adjacent fully saturated pixels; and
    wherein the adjusted printing hints require less memory space than the original printing hints.

2. The method according to claim 1, further comprising:
    adjusting printing hints for image pixels that are zero wherein zero pixels that are sequentially adjacent to pixels with printing hints indicating they are edge pixels will have their printing hints changed to indicate that they are edge pixels and will propagate the adjustment to further sequentially adjacent zero pixels.

3. The method according to claim 1, further comprising:
    losslessly compressing the adjusted printing hints.

4. The method according to claim 1, further comprising:
    using run length compression to compress the adjusted printing hints.

5. The method according to claim 1, further comprising:
    adjusting printing hints for a saturated pixel from a text pixel to edge pixel when there is no significant change in the end printed result.

6. The method according to claim 1, further comprising:
    reducing entropy in the printing hints by greater than forty percent.

7. A method for compressing data sent to a printer with no significant change in an output image, comprising:
generating image pixels having corresponding printing hints;
processing saturated pixels with different printing hints values by specifically processing at least one of, a saturated pixel sequentially adjacent to an edge pixel from a text pixel to an edge pixel and a zero pixel sequentially adjacent to an edge pixel from a background pixel to an edge pixel;
wherein the different printing hints require less memory space than the original printing hints.

8. The method according to claim 7, further comprising:
compressing the different rendering hint values using run length encoding.

9. The method according to claim 7, further comprising:
losslessly compressing the different rendering printing hint.

10. A printer comprising:
a contone rendering module for generating a first set of image pixels having corresponding printing hints for processing saturated pixels thereby producing different printing hint values, and
an image output terminal for receiving the different printing hint values to produce a second set of image pixels;
wherein the contone rendering module produces different printing hint values, wherein fully saturated pixels that are sequentially adjacent to pixels with printing hints indicating they are edge pixels will have their printing hints changed to indicate they are edge pixels and will propagate the adjustment to further sequentially adjacent fully saturated pixel; and
the different printing hint values requiring less memory space than the first printing hints.

11. The printer according to claim 10, wherein the contone rendering module produces different printing hint values for image pixels that are zero wherein zero pixels that are sequentially adjacent to pixels with printing hints indicating they are edge pixels will have their printing hints changed to indicate that they are edge pixels and will propagate the adjustment to further sequentially adjacent fully saturated pixel.

12. The printer according to claim 10, wherein the contone rendering module losslessly compresses the different printing hint values.

13. The printer according to claim 10, wherein the contone rendering module uses run length compression to compress the adjusted printing hint values.

14. The printer according to claim 10, wherein the contone rendering module adjusts printing hint values for a saturated pixel from a text pixel to edge pixel when there is no significant change in the end printed result.

15. The printer according to claim 10, wherein the contone rendering module reduces entropy in the printing hints by greater than forty percent.

16. The printer according to claim 10, wherein the contone rendering module uses more than one compression algorithm.

* * * * *